United States Patent
Nitta et al.

Patent Number: 5,399,656
Date of Patent: Mar. 21, 1995

[54] AROMATIC POLYESTERS AND A METHOD FOR PRODUCING THE SAME

[75] Inventors: Itaru Nitta, Tsukuba; Kuniaki Asai, Tondabayashi; Hiroshi Harada, Tsukuba, all of Japan

[73] Assignee: Sumitomo Chemical Company, Limited, Osaka, Japan

[21] Appl. No.: 867,229
[22] PCT Filed: Oct. 7, 1991
[86] PCT No.: PCT/JP91/01364
§ 371 Date: Jun. 4, 1992
§ 102(e) Date: Jun. 4, 1992
[87] PCT Pub. No.: WO92/06129
PCT Pub. Date: Apr. 16, 1992

[30] Foreign Application Priority Data

Oct. 8, 1990 [JP] Japan .................. 2-271013
Oct. 4, 1991 [JP] Japan .................. 3-257710

[51] Int. Cl.⁶ ............... C08G 63/02; C08G 63/00
[52] U.S. Cl. ................... 528/193; 528/182; 528/176
[58] Field of Search ............ 528/176, 193, 182

[56] References Cited

U.S. PATENT DOCUMENTS

| | | |
|---|---|---|
| 4,188,476 | 2/1980 | Irwin . |
| 4,318,841 | 3/1982 | East et al. . |
| 4,749,769 | 6/1988 | Kock et al. . |
| 4,749,770 | 6/1988 | Kock et al. . |
| 4,861,858 | 8/1989 | Kock et al. . |

FOREIGN PATENT DOCUMENTS

| | | |
|---|---|---|
| 0185522 | 6/1986 | European Pat. Off. . |
| 1958954 | 5/1971 | Germany . |
| 63-23925 | 2/1988 | Japan . |

OTHER PUBLICATIONS

*Databese WPI*, Week 7005, Derwent Publications Ltd., London, GB; AN 70-065105 & JP-A-45 001 606 (Chugai Pharmaceutical Co).

*Primary Examiner*—John Kight, III
*Assistant Examiner*—T. Mosley
*Attorney, Agent, or Firm*—Stevens, Davis, Miller & Mosher

[57] ABSTRACT

An aromatic polyester superior in heat resistance and mechanical properties and satisfactory in lightness and color tone is provided. The aromatic polyester has resorcinol structure, has the formula (1),

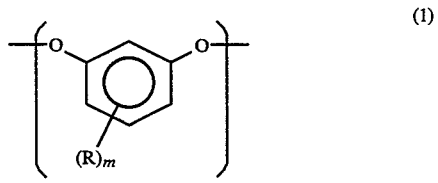

(1)

wherein R is halogen, $C_1$-$C_5$ alkyl, or phenyl; m is an integer of 0 to 2, and when m is 2, the two substituents represented by R may be different from each other; and gives a powder fraction having a lightness (L value) of 70 or more and a red degree (a value) of 5 or less, which powder fraction is obtained by pulverizing the heat-resistant aromatic polyester, sieving the pulverized polyester by Tyler standard sieves and being allowed to pass through 60-mesh sieve but not 325-mesh sieve.

8 Claims, No Drawings

AROMATIC POLYESTERS AND A METHOD FOR PRODUCING THE SAME

TECHNICAL FIELD

The present invention relates to a heat-resistant aromatic polyester having a resorcinol structure which is superior in heat resistance, mechanical properties and melt-moldability and has very good lightness and color tone; and a method for producing the same.

BACKGROUND ART

The technologies in such fields as electric, electronic, office automation (OA), audio-visual (AV), and automotive industries have been making remarkable progress in recent years. Polymeric materials used in such new fields are required to have meritorious properties such as high strength and high heat resistance. They have come to be required to have high level properties such as high dimensional accuracy, strength, rigidity, solder heat resistance and thin-wall processability by the advancement of reduction of the size and wall thickness particularly of electric parts such as relay parts, coil bobbins and connectors. As one of the polymeric materials which can satisfy the requirements, aromatic polyesters are suitably used. Among the aromatic polyesters, particularly aromatic polyesters showing liquid crystalline property in molten state have desirable thin-wall processability and are rapidly coming into wide use as a material for electric parts.

However, the aromatic polyesters showing liquid crystalline property in molten state have such disadvantages as low impact resistance, low weld strength and high irregularity of shrinkage in every direction. Therefore, in fact, the improvement of these disadvantages has been strongly desired. Since these disadvantages are expected to be overcome by reducing the liquid crystalline property of the polyesters, the introduction of nucleus-substituted structure or a bending structure into the polymer chains, addition of glass fibers, etc. are now under investigation.

The aromatic polyesters showing liquid crystalline property in molten state have high heat resistance due to their stiff molecular chains. However, because of this, they have to be molded at elevated temperatures. Therefore, in some application fields wherein the reduction of heat resistance is accepted to some degree, there has been a strong requirement of developing an aromatic polyester showing liquid crystalline property in molten state which can be molded at relatively low temperatures. The introduction of a nucleus-substituted structure or a bending structure into the polymer chains has been likewise tried in order to lower the melting point of the polyesters without damaging their mechanical properties, thereby improving the moldability. When a notice is given to the introduction of a bending structure into the polymer chains, the use of resorcinol as a bending monomer is particularly of technical interest in view of its easy availability in industry.

Although acetylation method, phenyl esterification method and acid chloride method are known as the methods for producing aromatic polyesters, the aromatic polyesters showing liquid crystal property in molten state are mostly produced by acetylation method, in which polymerization is carried out by solution polymerization in a solvent having a high boiling point or by melt polymerization using substantially no solvent. In acetylation method, an aromatic hydroxy compound, one of the monomers, is converted into an acetic acid ester by the reaction between an aromatic hydroxy compound and acetic anhydride and the acetic acid ester is then polymerized by the intermolecular elimination of acetic acid. The conversion of an aromatic hydroxy compound into an acetic acid ester is generally conducted by adding acetic anhydride in an excess amount of about 1.1 moles per mole of the hydroxyl group and allowing the resulting mixture to react under reflux of acetic anhydride.

However, the preparation of resorcinol diacetate by the above method problematically accompanies the coloring of the reaction product and the formation of by-products. The purification of the colored reaction product by distillation under reduced pressure is still insufficient to obtain resorcinol diacetate having a high purity enough to use it as a monomer for the aromatic polyester. Thus, by the acetylation method, it was difficult to obtain a practically usable polymer having a resorcinol structure, sufficiently high molecular weight and good lightness and color tone, although such a polyester is expected to have desirable physical properties.

The use of the phenyl esterification method, in which polycondensation proceeds via intermolecular elimination of phenol, generally cannot raise the molecular weight of the resulting polymer so much. In addition, the size of the equipment for discharging the phenol generated during the elimination out of the system is obliged to be large due to the necessity of sufficiently keeping the temperature of the equipment at a certain level for avoiding the solidification of phenol which has such a high boiling point as 182° C. This method, therefore, is industrially unapplicable.

The acid chloride method, in which polycondensation proceeds via dehydrochlorination, generally cannot raise the molecular weight of the resulting polymer so much. In addition, the use of special corrosion-resisting material is required for constructing the equipment due to the corrosive property of hydrogen chloride gas generated during the reaction. This method, therefore, is industrially unapplicable.

DISCLOSURE OF THE INVENTION

The present inventors have extensively studied the acetylation of resorcinol. Particularly, conc. sulfuric acid remarkably accelerates this reaction, and the reaction exothermically proceeds in the presence of conc. sulfuric acid. However, the reaction product obtained is colored red. The polymer obtained by polymerizing the red-colored product has a low molecular weight and is intensely colored. Therefore, the polymer has no practical value. The present inventors analyzed this reaction product by high-performance liquid chromatography (HPLC) and unclear magnetic resonance (NMR) to find that the desired resorcinol diacetate had been formed in a yield of only about 90 mole %, and by-products such as resacetophenone formed by the replacement of hydrogen attached to the benzene nucleus by an acetyl group, etc. had been formed.

In order to solve the foregoing problems, the present inventors have extensively researched a catalyst which encourages the reaction between resorcinol and acetic anhydride so as to give resorcinol diacetate in high yields. As a result, surprisingly, the present inventors have found that tertiary amines represented by pyridine are a highly active catalyst for selectively preparing resorcinol diacetate, in other words, the presence of tertiary amines prevents the formation of by-products such as resacetophenone, etc.

That is, the present inventors have found a method for producing highly pure resorcinol diacetates characterized by carrying out the reaction between resorcinol and acetic anhydride in the presence of a tertiary amine in an amount of 0.01 part by weight or more, preferably 0.02 to 3 parts by weight, more preferably 0.03 to 2 parts by weight per 100 parts by weight of resorcinol.

The tertiary amines having highly selective catalytic activity include pyridine, triethylamine, N,N-dimethylaniline and 4-dimethylaminopyridine. Preferred ones having particularly superior selectivity include pyridine and 4-dimethylaminopyridine. Further, preferred ones which are low in the cost and easily usable in industry include pyridine, triethylamine and N,N-dimethylaniline. Particularly, pyridine is preferred.

The present inventors also have extensively studied on aromatic polyesters prepared using the highly pure resorcinol diacetate produced according to the present invention as one of the monomers. As a result, they have found that the use of the highly pure resorcinol diacetate gives a polymer having not only a sufficiently high molecular weight and a very good color tone but also superior heat resistance and mechanical properties and a good melt-moldability. The present inventors thus attained to the present invention.

The present invention relates to a heat-resistant aromatic polyester resin which has resorcinol structure, has the formula (1),

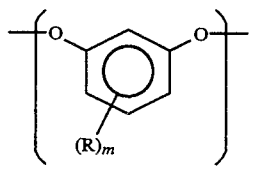
(1)

wherein R is halogen, $C_1$–$C_5$ alkyl, or phenyl; and m is an integer of 0 to 2, and when m is 2, the two substituents represented by R may be different from each other; and gives a powder fraction having a lightness (L value) of 70 or more and a red degree (a value) of 5 or less, which powder fraction is obtained by pulverizing the heat-resistant aromatic polyester to a particle size of 300 μm or less, sieving the pulverized polyester by Tyler standard sieves and being allowed to pass through 60-mesh sieve but not 325-mesh sieve; and a method for producing the aromatic polyester.

Particularly, in terms of the balance of physical properties, it is desirable for the aromatic polyester of the present invention to contain the repeating unit of the formula (1) and at least one repeating unit selected from the group consisting of the units contained in the formula groups (2), (3) and (4):

formula group (2),

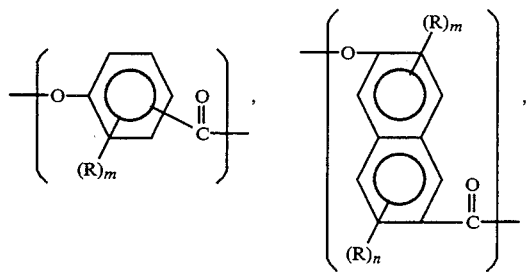

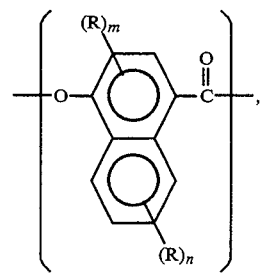

formula group (3),

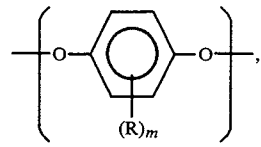

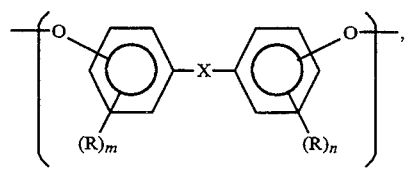

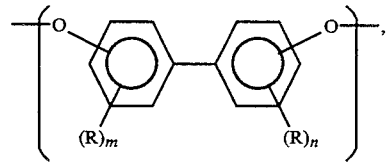

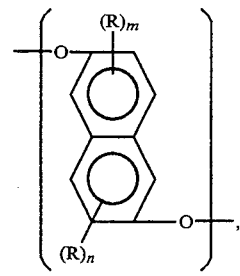

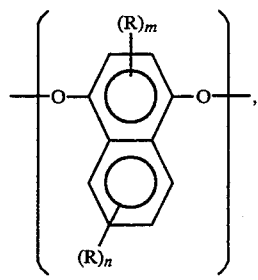

and formula group (4),

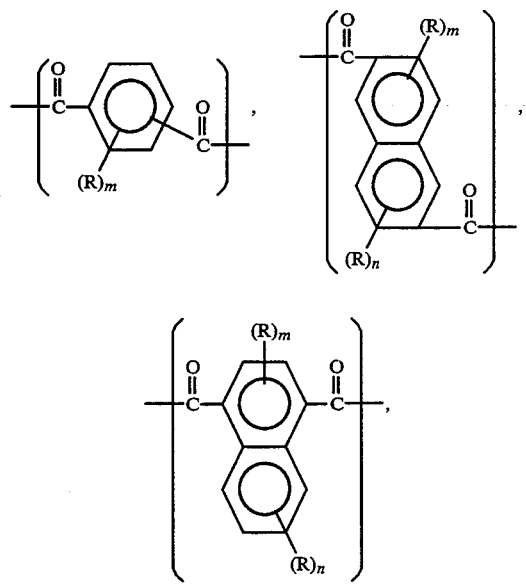

wherein R is halogen, $C_1$–$C_5$ alkyl or phenyl; X is either one of

—O—, —CH$_2$—, —CH$_2$—CH$_2$—,

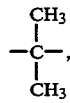

—SO$_2$— or —S—; and each of m and n is an integer of 0 to 2, and when the number of R in the repeating units is 2 or more, the two or more substituents represented by R may be different from each other.

Of these repeating units, preferred ones are those contained in the formula group (5), formula group (5),

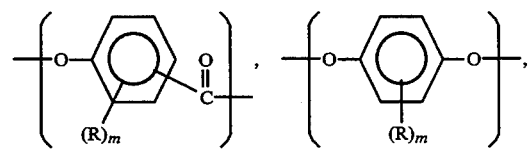

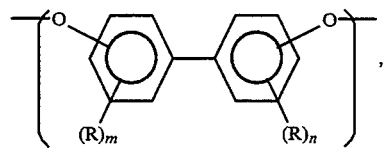

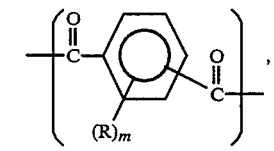

wherein R, m and n are as defined above.

Of these, particularly preferred repeating units are those in which both m and n are zero, that is, those having no substituent R.

Selecting proper combinations out of these preferred repeating units permits the provision of a heat-resistant aromatic polyester having good physical properties and well-balanced characteristics between moldability and heat resistance.

The aromatic polyester composed of 40 to 80 mole % of the repeating unit of the formula (6), 29 mole % or less of the repeating unit of the formula (7), 1 to 30 mole % of the repeating unit of the formula (8) and 10 to 30 mole % of the repeating unit of the formula (9), is particularly preferred.

Also, the aromatic polyester composed of 40 to 80 mole % of the repeating unit of the formula (6), 1 to 30 mole % of the repeating unit of the formula (8) and 10 to 30 mole % of the repeating unit of the formula (9), is likewise preferred.

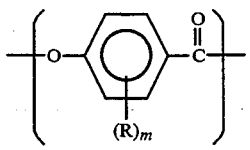 (6)

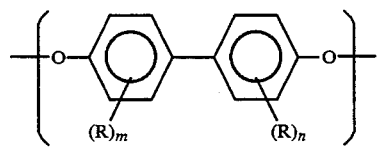 (7)

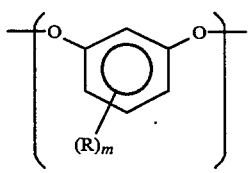 (8)

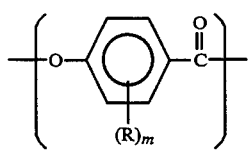 (9)

wherein R is halogen, $C_1$–$C_5$ alkyl or phenyl; and each of m and n is an integer of 0 to 2, and when the number of R in the repeating units is 2 or more, the two or more substituents represented by R may be different from each other.

Of these, particularly preferred repeating units are those in which both m and n are zero, that is, those having no substituent R.

Also, the aromatic polyester composed of 40 to 80 mole % of the repeating unit of the formula (10), 29 mole % or less of the repeating unit of the formula (11), 1 to 30 mole % of the repeating unit of the formula (12) and 10 to 30 mole % of the repeating unit of the formula (13), is particularly preferred:

Also, the aromatic polyester composed of 40 to 80 mole % of the repeating unit of the formula (10), 1 to 30 mole % of the repeating unit of the formula (12) and 10 to 30 mole % of the repeating unit of the formula (13), is likewise preferred.

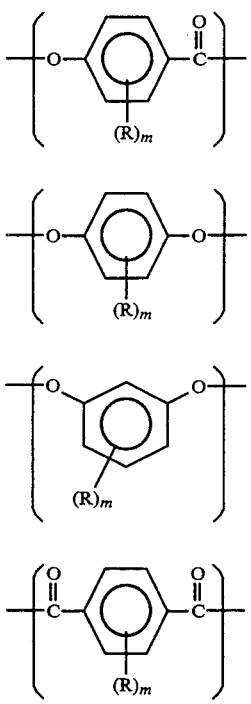

wherein R is halogen, $C_1$–$C_5$ alkyl or phenyl; and m is an integer of 0 to 2, and when m is 2, the two substituents represented by R may be different from each other.

Of these repeating units, particularly preferred are those in which m is zero, that is, those having no substituent R.

The aromatic polyester having resorcinol structure [formula (1)] of the present invention is characterized not only by its high heat resistance, mechanical properties and melt-moldability but also by its good lightness and color tone. A method for measuring the lightness and color tone will be illustrated below.

An aromatic polyester resin is pulverized into a powder having a particle size of 300 μm or less. The powder is sieved by two kinds of Tyler standard sieve, one of which is a 60-mesh sieve (mesh size: 246 μm) and the other of which is a 325-mesh sieve (mesh size: 43 μm), to obtain a resin powder fraction ranging from a maximum particle size smaller than 246 μm to a minimum particle size of 43 μm or more. In order to indicate the object color of the powder thus obtained, its tristimulus values, X, Y and Z, were measured with a 1 colorimetric color-difference meter according to 0°-d method prescribed by JIS Z 8722. The lightness (L value) and red degree (a value) were obtained from these values with Hunter's color difference equation prescribed by JIS Z 8730. The larger the L value, the higher the lightness of the color, and the larger the a value, the intenser the reddish tone.

The aromatic polyester having resorcinol structure [formula (1)] of the present invention shows a lightness (L value) of 70 or more and a red degree (a value) of 5 or less when measured by the above method. The aromatic polyester having a lightness of 75 or more and a red degree of 3 or less have a high commodity value, so that they are preferred. Those having a lightness of 80 or more and a red degree of 2 or less are more preferred.

The present invention further relates to a method for producing a heat-resistant aromatic polyester which has resorcinol structure and has the formula (1) characterized by using as a monomer highly pure resorcinol diacetates produced by reacting a resorcinol having the formula (14),

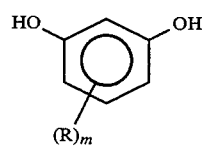

wherein R is halogen, $C_1$–$C_5$ alkyl, or phenyl; and m is an integer of 0 to 2, and when m is 2, the two substituents represented by R may be different from each other, with acetic anhydride in the presence of a tertiary amine.

There are many examples of disclosure of the aromatic polyesters having resorcinol structure as described in JP-A-54-93095, JP-A-57-87423, JP-A-60-28428, JP-A-60-38426, JP-A-63-12629 and JP-A-63-317032; Japanese Patent Application No. 62-13979; JP-A-1-261416, JP-A-1-266131, JP-A-1-266132 and JP-A-2-51523; Polymer Journal, Vol. 21, pp. 615–622 (1989); and the like. None of the examples listed above teaches the use of a tertiary amine as an active catalyst for selectively producing monomer resorcinol diacetates, which use is described in the present invention. Additionally, they fail to contain detailed description on the purity of resorcinol diacetates.

Moreover, they contain no examples of disclosure at all that the liquid-crystal aromatic polyesters composed of the foregoing repeating units of the formulae (6), (7), (8) and (9) in the foregoing molar ratios, or the repeating units of the formulae (10), (11), (12) and (13) in the foregoing molar ratios have particularly superior mechanical properties and well-balanced characteristics between heat resistance and moldability.

Furthermore, many examples of disclosure state that resorcinol diacetates are pale yellow and transparent liquids at room temperature at normal pressure. However, the resorcinol diacetates produced by reacting a resorcinol with acetic anhydride in the presence of a tertiary amine are colorless and transparent liquids at room temperature at normal pressure.

The resorcinol diacetates produced by the above method have an extremely high purity, and give polymers having a sufficiently high molecular weight by the polymerization without causing any problems such as coloration, etc. The polymers, therefore, have high heat resistance and mechanical properties and a good melt-moldability.

The monomers from which the repeating units of the aromatic polyester disclosed in the present invention are derived are not critical provided that one of the monomers is a resorcinol diacetate produced in the presence of a tertiary amine. However, in view of the heat resistance of the resulting polymer, it is preferable to select an aromatic compound having one or more hydroxyl groups and/or one or more carboxyl groups in the molecule as the monomer other than the resorcinol diacetate.

Specifically, in terms of the balance of the physical properties, it is preferable to select as the other monomers at least one monomer giving a repeating unit selected from the group consisting of the repeating units contained in the group of the formulas (2), (3) and (4).

The proper selection of the repeating units imparts a liquid crystalline property in molten state to the aromatic polyester containing the repeating unit derived from the highly pure resorcinol diacetate. Specific examples of the repeating units giving the liquid-crystal aromatic polyester having good physical properties and well-balanced characteristics between heat resistance and moldability are those having the above-mentioned formulas (6), (7), (8) and (9), which may be combined within the above-mentioned molar ratios. The other specific examples of the repeating units are those having the above-mentioned formulas (10), (11), (12) and (13), which may be combined within the above-mentioned molar ratios. The desirable mechanical properties and well-balanced characteristics between heat resistance and moldability of the liquid-crystal aromatic polyester disclosed in the present invention are considered to be due to the bending structure formed by the introduction of the resorcinol structure into the molecular chain.

The aromatic polyester of the present invention is produced by solution polymerization with high-boiling solvents or by fusion polymerization with substantially no solvent according to the acetylation method using as starting materials aromatic diols including resorcinol. The acetate, a monomer, is obtained by reacting the corresponding hydroxy compound with acetic anhydride in the presence of a tertiary amine, as described above.

The polymerization may be carried out at normal pressure in an inert gas atmosphere or under reduced pressure. The molecular weight of the polymer can further be increased by pulverizing the obtained polymer and subjecting the pulverized polymer to solid-phase polymerization in which heat-treatment is carried out in an inert gas atmosphere or under reduced pressure.

Hereinafter, the methods for producing the aromatic polyester having resorcinol structure of the present invention will be illustrated in detail. Among the methods is also a method for producing the aromatic polyester using as a monomer the acetate of an aromatic hydroxy compound including resorcinol that has been synthesized in the presence of a tertiary amine. However, an illustration will be given here on a method of manufacture in which polymerization is carried out in situ after the synthesis of the acetate.

Generally, in order to obtain the polyester having a high molecular weight, it is necessary to equalize the numbers of moles of the hydroxyl group and carboxyl group. In the preparation of the aromatic polyester having resorcinol structure of the present invention, however, it is preferable to use a resorcinol in an amount fed larger than the stoichiometrically calculated amount, because the boiling point of resorcinol diacetate is lower than that of the acetate of other monomers. Specifically, it is preferable to feed the resorcinol in an amount 1 to 1.5 times, preferably 1 to 1.3 times as much as the stoichiometrically calculated one.

To a reactor are fed the monomers including resorcinol and acetic anhydride so that the molar amount of acetic anhydride is 1.1 times as much as the total number of mole of the hydroxyl groups of the monomers. After replacing air in the reactor by nitrogen, the mixture is well stirred to dissolve the monomers such as resorcinol, etc. in acetic anhydride. Thereafter, a tertiary amine is added thereto in an amount of 0.01 part by weight or more per 100 parts by weight of the aromatic hydroxy compound in the monomers. Thereafter, the contents of the reactor are heated, and acetylation is carried out for about 1 to about 3 hours at a reaction temperature (refluxing temperature) of about 80° to about 145° C. Subsequently, polymerization is carried out by raising the inner temperature of the reactor at a rate of 1° to 5° C./min while removing the formed acetic acid by distillation. The polymerization may be carried out at normal pressure in an inert gas atmosphere or under reduced pressure. The molecular weight of the polymer obtained can further be increased by pulverizing the polymer and subjecting the pulverized polymer to solid-phase polymerization in which heat-treatment is carried out in an inert gas atmosphere or under reduced pressure.

The aromatic polyester obtained by polymerizing proper species of monomers in a proper mixing ratio shows liquid crystalline property in molten state. At the time of fusion, the molecular chains of the polyester showing liquid crystalline property in molten state are hardly entangled with one another, so that the melt viscosity of the polyester is extremely low and the molecular chains are highly oriented in the flow direction by a slight shear force. Consequently, the molded products obtained from the polyester showing liquid crystalline property in molten state, although their anisotropy is large, have high strength, high stiffness and high heat resistance.

Various methods are available for determining the molecular weight of the aromatic polyester of the present invention and the physical properties which are a measure for knowing the molecular weight. Generally, the molecular weight of polymers which are insoluble in solvents cannot be determined directly by means such as light scattering method (LS), gel permeation chromatography (GPC), etc. It also cannot be evaluated by measuring the physical properties (e.g. solution viscosity) which are a measure for knowing the molecular weight. However, for polymers which are insoluble in solvents, the flow temperature defined below can be utilized as a measurable physical property item which is a measure for knowing the molecular weight.

Flow temperature: A temperature at which a polymer shows a melt viscosity of 48,000 poises when melted by heating at a rate of temperature-rise of 4° C./min and pushed out of a nozzle of 1 mm in internal diameter and 10 mm in length under a load of 100 kg/cm$^2$.

Also, for aromatic polyesters showing liquid crystalline property in molten state, the liquid crystallization temperature defined as a temperature at which the polymer shows optical anisotropy is also useful as a measure for knowing the molecular weight. The liquid crystallization temperature can be determined with a polarization microscope equipped with a heating stage. For polymers which are soluble in suitable solvents, the flow temperature and liquid crystallization temperature can be determined, and in addition, the analysis by LS and GPC also can be used.

The molecular weight of the aromatic polyester of the present invention is not critical. However, from the standpoints of heat resistance and mechanical characteristics, the flow temperature defined above is preferably 180° C. or more. From the standpoint of sufficient mechanical characteristics, a flow temperature of 200° C. or more is particularly preferred.

To the aromatic polyester of the present invention can be blended fillers used in conventional aromatic polyesters, if necessary. That is, fibrous reinforcing agents (e.g. glass fibers, silica-alumina fibers, wollastonite, carbon fibers, potassium titanate fibers), inorganic fillers (e.g. calcium carbonate, talc, mica, clay, glass beads), solid lubricants represented by polytetrafluoroethylene and graphite, antioxidants, heat stabilizers, etc. can be added thereto as need arises.

In pelletizing the aromatic polyester of the present invention, there is no particular limitation to means to blend the aromatic polyester and other components. That is, it is common practice to mix the aromatic polyester, fillers (e.g. glass fibers), pigments, heat stabilizers, etc. with a Henschel mixer, tumbler, etc., and melt-knead and pelletize the mixture through an extruder.

Originally, resorcinols are monomers having meta-orienting property and are of great interest in having such a property that the use thereof as a monomer for preparing highly crystalline aromatic polyesters efficiently reduces the melting point of the resulting polyesters and markedly improves the processability of the resulting polyesters.

However, in the absence of a catalyst, the reaction between resorcinols and acetic anhydride gave resorcinol diacetates of low purity. Therefore, it was impossible to produce aromatic polyesters having a resorcinol skeleton from the corresponding resorcinol diacetates by acetylation method, although good physical properties can be expected for such polyesters.

However, as shown in the disclosure of the present invention, resorcinol diacetates of high purity can be obtained by reacting resorcinols and acetic anhydride in the presence of a tertiary amine. Consequently, the polymerization using such highly pure resorcinol diacetates gives aromatic polyesters superior in heat resistance, mechanical properties, melt processability and color tone.

When the above aromatic polyester has liquid crystalline property in molten state, it is possible to provide a liquid-crystal aromatic polyester having will-balanced characteristics between heat resistance and moldability.

BEST MODE FOR CARRYING OUT THE INVENTION

The present invention will be illustrated with reference to the following examples, but it is not to be interpreted as being limited thereto. Physical properties in the examples were measured by the following methods.

(1) High-performance liquid chromatography (hereinafter referred to as HPLC): Measured with methanol/acetic acid (volume ratio: 1000/5) and water/acetic acid (volume ratio: 1000/5) as a mobile phase by means of the 600E Multisolvent Transportation System (mfd. by Waters, Millipore Corp.) according to the low-pressure gradient method. The column used was a octadecylsilyl (ODS) column of 6.0 mm in internal diameter and 15 cm in length. Calculation of determination was carried out by the absolute calibration method, and the conversion, selectivity and yield in every reaction were calculated from the values obtained.

(2) Proton nuclear magnetic resonance spectrometry (hereinafter referred to as $^1$H-NMR method): Measured at room temperature with tetramethylsilane as the standard of chemical shift by means of a Model AC-200P Proton Nuclear Magnetic Resonance Spectrometer (200, 133 MHz) (mfd. by Bulker Inc.). The sample solution was prepared by dissolving 10 mg of a sample in 0.4 ml of deutero dimethyl sulfoxide.

(3) Flow temperature: Measured using a Model CFT-500 Flow Tester (mfd. by Shimadzu Corp.). It is a temperature at which a polymer shows a melt viscosity of 48,000 poises when melted by heating at a rate of temperature-rise of 4° C./min and pushed out of a nozzle of 1 mm in internal diameter and 10 mm in length under a load of 100 kg/cm$^2$.

(4) Lightness (L value) and color tone [red degree (a value) and yellow degree (b value)]: The polymer was pulverized into particles having a particle size of 300 μm or less using a bantam mill (mfd. by Hosokawa Micron Inc.). Then, the particles were sieved with two Tyler standard sieves, one of which is a 60-mesh sieve (mesh size: 246 μm) and the other of which is a 325-mesh sieve (mesh size: 43 μm), to obtain a powder fraction ranging from a maximum particle size smaller than 246 μm to a minimum particle size of 43 μm or more.

In order to indicate the object color of the powdery sample thus obtained, its tristimulus values, X, Y and Z, were measured with a colorimetric color difference meter, Z-1001DP (mfd. by Nippon Denshoku Kogyo Inc.), according to the 0°-d form prescribed by JIS Z 8722, and the lightness (L value), red degree (a value) and yellow degree (b value) were obtained from the above values using Hunter's color difference equation prescribed in JIS Z 8730.

(5) Optical anisotropy: The optical anisotropy of the resin in molten state was examined by heating the powdery polymer on a heating state at a rate of temperature-rise of 10° C./min under polarized light and macroscopically observing the state of the polymer. When the resin did not melt perfectly as it was left still, the test was carried out under pressure by means of spring pressure.

(6) Gel permeation chromatography (GPC): HLC-8020 (produced by TOSOH CORP.) was used. The size of the column was 7.8 mm inside diameter and 30 cm length, and the mobile phase used was a mixed solution of 2,3,5,6-tetrafluorophenol (TFP) and chloroform (volume ratio: TFP/CHCl$_3$ = 1/2.721). Five milligrams of the sample was dissolved in 5 ml of 2,3,5,6-tetrafluorophenol, and the resulting solution was diluted with chloroform to two times the volume. Thereafter, the solution was prefiltered through a filter having a pore size of 0.45 μm, and the filtrate was used for measurement. Calculation of the molecular weight was calculated using a calibration curve prepared with standard polystyrenes.

(7) Solution viscosity: Measured at 60° C. with tetrafluorophenol (TFP) as a solvent using a Ubbelohde's viscometer.

(8) Physical properties of molded product: The various physical properties of molded products were measured by the following methods.

Flexural strength and modulus of elasticity: Test pieces for bending (length: 127 mm, width: 12.7 mm, and thickness: 6.4 mm) were molded from the aromatic polyester of the present invention, and measurement was carried out according to ASTM D-790.

Izod impact strength without notch: Test pieces were prepared by cutting the test pieces for bending into two equal parts in the lengthwise direction, and measurement was carried out according to ASTM D-256.

Tensile strength of thin-wall molded product: The tensile strength was determined using dumb-bell test pieces for tensile test (wall thickness: 0.5 mm, length: 75 mm, and width of neck portion: 5 mm) molded from the aromatic polyester of the present invention. Due to the skin structure of the test pieces of the aromatic polyester having liquid crystalline property in molten state, the tensile strength depends largely upon the thickness of the test piece. Even when the molded product of the aromatic polyester has a thin wall, it shows high tensile strength.

Heat distortion temperature (HDT): Measured according to ASTM D-648 using the test piece for bending.

Solder heat resistance: Dumb-bell test pieces for tensile test (wall thickness: 1.2 mm, length: 75 mm, and width of neck portion: 5 mm) were molded from the aromatic polyester resin. The test pieces were immersed in a fusion bath of solder, HA60A, containing 60% of tin and 40% of lead. The temperature of the solder bath was raised by 5° C. while keeping the bath at every temperature for 60 seconds. The maximum temperature at which the test pieces showed no foaming nor deformation was determined and taken as the solder heat resistance. For example, when the test pieces first show foaming or deformation at 275° C., the solder heat resistance is determined to be 270° C.

Thin-wall flow length: Using a 4-piece mold of which each piece was rectangular (wall thickness: 0.3 mm, length: 46 mm, and width: 5 mm), the aromatic polyester in molten state was charged into the mold under prescribed injection conditions. And, the flow length in the lengthwise direction of every rectangle was measured, and the flow length was expressed in terms of the average value. Due to the low melt viscosity of the aromatic polyester having liquid crystalline property in molten state, the aromatic polyester shows large thin-wall flow length and good moldability.

REFERENTIAL EXAMPLES 1 TO 4 AND COMPARATIVE REFERENTIAL EXAMPLES 1 AND 2

Acetylation of Resorcinol—Catalytic Effect

In a 200-ml round-bottom flask equipped with a crescent stirring blade, a three-way stopcock and a Dimroth condenser were charged 0.5 mole (55.0 g) of resorcinol and 1.1 moles (112.2 g) of acetic anhydride. The atmosphere in the system was replaced by nitrogen by introducing nitrogen into the system through the three-way stopcock, and resorcinol was dissolved in acetic anhydride while rotating the crescent stirring blade at 120 rpm. Thereafter, 275 mg of pyridine (0.5 part by weight per 100 parts by weight of resorcinol), a tertiary amine, was added. The flask was immersed in an oil bath while streaming cooling water through the Dimroth condenser, and the oil bath was heated. Reaction was carried out for 1 hour while maintaining the inner temperature at 100° C. The reaction product obtained was a colorless and transparent liquid at room temperature (Referential Example 1).

Further, in the same manner as in Referential Example 1, three kinds of an acetic anhydride solution of resorcinol were prepared, and 275 mg each of triethylamine, N,N-dimethylaniline and 4-dimethylaminopyridine (0.5 part by weight per 100 parts by weight of resorcinol) was added thereto as a tertiary amine. In the same manner as in Referential Example 1, resorcinol was allowed to react with acetic anhydride. The reaction products obtained were all colorless and transparent liquids at room temperature (Referential Examples 2 to 4).

Next, an acetic anhydride solution of resorcinol prepared in the same manner as in Referential Example 1 was heated without adding a tertiary amine, and acetylation was carried out for 3 hours while refluxing acetic anhydride. The reaction product obtained was an orange and transparent liquid at room temperature (Comparative Referential Example 1).

One drop of conc. sulfuric acid was added to an acetic anhydride solution of resorcinol prepared in the same manner. As a result, the reaction system generated heat to raise the inner temperature to 102° C. Thereafter, the flask was immersed in an oil bath, and reaction was carried out for 1 hour while maintaining the inner temperature at 100° C. The reaction product obtained was a red and transparent liquid at room temperature (Comparative Referential Example 2).

The reaction products obtained in Comparative Referential Examples 1 and 2 and Referential Examples 1 to 4 were analyzed by HPLC, and the conversion, selectivity and yield on resorcinol diacetate and the percent formation of by-products were calculated. These results are collectively shown in Table 1.

Table 1 demonstrates that in Referential Example 1, the conversion, selectivity and yield are all 100%; in Referential Examples 2 to 4, the selectivity is 100%; and in all the Referential Examples 1-4, no by-products are produced. Also, the analysis of the reaction products obtained in Comparative Referential Examples 1 and 2 by NMR shows that most of the by-products are compounds having a resacetophenone structure produced by the replacement of the hydrogen atom attached to the benzene nucleus by an acetyl group.

COMPARATIVE REFERENTIAL EXAMPLE 3

Purification of Resorcinol Diacetate by Distillation Under Reduced Pressure

Purification of the reaction product obtained in Comparative Referential Example 1 by distillation under reduced pressure was tried. First, after removing acetic acid by distillation at normal pressure, the pressure in the system was reduced to 10 mmHg. Distillation under reduced pressure was then carried out at a kettle temperature of 165° C. and a vapor temperature of 155° C. The resorcinol diacetate thus obtained showed a purity of 98.6%. It reveals that it is impossible to prepare by distillation under reduced pressure resorcinol diacetate having a purity necessary to use it as a monomer for aromatic polyester.

EXAMPLES 1 TO 7 AND COMPARATIVE EXAMPLE 1

Aromatic Polyester (1) Having Resorcinol Structure

In a polymerization vessel equipped with an anchor-shaped stirring blade were charged p-hydroxybenzoic acid, tetraphthalic acid and resorcinol so that the total amount of these monomers was 12 moles and the molar ratio between them was varied as shown in Table 2. To the resulting mixture was added acetic anhydride in an amount of 1.1 moles per mole of hydroxyl groups. After stirring for 15 minutes, pyridine was added thereto in an amount of 0.5 part by weight per 100 parts by weight of resorcinol. Thereafter, the atmosphere in the reaction system was sufficiently replaced by nitrogen, and acetylation was carried out at a reaction temperature of 100° C. for 1 hour.

Thereafter, the contents of the vessel were heated to 270° C. at a rate of temperature-rise of 1° C./min while removing formed acetic acid by distillation. After maintaining the temperature at 270° C. for 90 minutes, the temperature was further raised to 300° C. at a rate of temperature-rise of 1° C./min.

Polymerization was then carried out for 50 minutes under a reduced pressure of 10 mmHg for Examples 1 to 3, and for 50 minutes at normal pressure for Examples 4 to 7. The polymers thus obtained were pulverized into particles of 300 μm or less in particle size by means of a Bantam mill (mfd. by Hosokawa Micron Inc.), and in Examples 4, 5 and 7, the particles were further subjected to solid-phase polymerization at 210° C. for 3 hours in nitrogen atmosphere.

Next, for comparison, an example (Comparative Example 1) will be shown in which an aromatic polyester having a resorcinol having a resorcinol skeleton was produced in the same composition as in Example 4 without using a catalyst such as pyridine, etc. Monomers in a molar ratio shown in Table 2 were charged in the same reactor as used in Example 4, and acetic anhydride was added thereto in an amount of 1.1 moles per mole of the hydroxyl group. Thereafter, the contents of the reactor were heated with stirring in nitrogen gas atmosphere, and acetylation reaction was carried out for 3 hours under reflux while maintaining the heater temperature at 180° C. Thereafter, polymerization at normal pressure and solid-phase polymerization were carried out in the same manner as in Example 4 to obtain a polymer.

Table 2 shows the results of analysis of the aromatic polyesters having a resorcinol structure obtained in Examples 1 to 7 and Comparative Example 1. Table 3 shows the physical properties of molded products of the aromatic polyesters obtained in Examples 4 to 6 and Comparative Example 1.

These results reveal that the aromatic polyesters having a resorcinol structure produced using a highly pure resorcinol diacetate synthesized in the presence of a tertiary amine are superior in heat resistance and mechanical properties and satisfactory in melt-moldability and color tone.

Further, it can be seen from Example 7 that the aromatic polyester having a higher molecular weight can be obtained by feeding resorcinol of 1.025 time as much as the equivalent weight.

EXAMPLES 8 TO 13 AND COMPARATIVE EXAMPLES 2 TO 7

Aromatic Polyester (2) Having a Resorcinol Structure

In a polymerization vessel equipped with an anchor-shaped stirring blade were charged p-hydroxybenzoic acid, terephthalic acid, resorcinol and an aromatic diol shown in Table 4 so that the total amount of these monomers was 12 moles and the molar ratio between them was varied as shown in Table 4. To the resulting mixture was added acetic anhydride in an amount of 1.1 moles per mole of hydroxyl groups. After stirring for 15 minutes, pyridine was added in an amount of 0.5 part by weight per 100 parts by weight of the total weight of resorcinol and the aromatic diol. Thereafter, the atmosphere in the reaction system was sufficiently replaced by nitrogen, and acetylation was carried out for 1 hour at a reaction temperature of 100° C. Thereafter, the contents of the vessel were heated to 270° C. at a rate of temperature-rise of 1° C./min while removing formed acetic acid by distillation. After maintaining the temperature at 270° C. for 90 minutes, the temperature was further raised to 300° C. at a rate of temperature-rise of 1° C./min, and polymerization was carried out for 50 minutes under a reduced pressure of 10 mmHg (Examples 8 to 13).

Next, for comparison, examples (Comparative Examples 2 to 7) will be shown in which the aromatic polyesters having a resorcinol structure were produced using the same monomers and compositions as in Examples 8 to 13 without using a catalyst such as pyridine, etc. Monomers in a molar ratio shown in Table 4 were charged in the same reactor as used in Examples 8 to 13, and acetic anhydride was added thereto in an amount of 1.1 moles per mole of hydroxyl groups. Thereafter, the contents of the reactor were heated with stirring in a nitrogen gas atmosphere, and acetylation reaction was carried out for 3 hours under reflux while maintaining the heater temperature at 180° C. Thereafter, polymerization under reduced pressure was carried out in the same manner as in Examples 8 to 13 to obtain a polymer.

Table 4 shows the results of analysis of the aromatic polyesters having a resorcinol structure obtained in Examples 8 to 13 and Comparative Examples 2 to 7 and the physical properties of the molded products of the aromatic polyesters.

The results reveal that the aromatic polyesters having a resorcinol structure produced using a highly pure resorcinol diacetate synthesized in the presence of a tertiary amine are superior in heat resistance and mechanical characteristics and satisfactory in melt-moldability and color tone even if an aromatic diol other than resorcinol is used together as a monomer.

EXAMPLES 14 TO 26 AND COMPARATIVE EXAMPLE 8

Aromatic Polyester (3) Having Resorcinol Structure

In a polymerization vessel equipped with an anchor-shaped stirring blade were charged p-hydroxybenzoic acid, terephthalic acid, resorcinol and 4,4'-dihydroxydiphenyl so that the total amount of these monomers was 12 moles and the molar ratio between them was varied as shown in Table 5. To the resulting mixture was added acetic anhydride in an amount of 1.1 moles per mole of hydroxyl groups. After stirring for 15 minutes, pyridine was added in an amount of 0.5 part by weight per 100 parts by weight of the total weight of resorcinol and 4,4'-dihydroxydiphenyl.

Thereafter, the atmosphere in the reaction system was sufficiently replaced by nitrogen, and acetylation was carried out for 1 hour at a reaction temperature of 100° C. Thereafter, the contents of the vessel were heated to 270° C. at a rate of temperature-rise of 1° C./min while removing formed acetic acid by distillation. After maintaining the temperature at 270° C. for 1 hour, the temperature was further raised to 300° C. at a rate of temperature-rise of 1° C./min, and polymerization was carried out for 70 minutes at normal pressure. The reaction product in molten state was taken out of the system and solidified at room temperature. The yield in every case in Table 5 was in the range of 94 to 98% of the theoretical yield.

Every reaction product was pulverized into a powder of 300 μm or less in particle size using a Bantam mill (mfd. by Hosokawa Micron Inc.). The powder was further treated at 300° C. for 3 hours in a nitrogen gas atmosphere to obtain the powdery aromatic polyester of resorcinol structure having a flow temperature of 230° to 340° C. The lightness (L value) and color tone, a value and b value, of the aromatic polyester were measured according to the foregoing method. The results are collectively shown in Table 5. Table 5 demonstrates that the lightness and color tone are good in all the Examples.

In Examples 25 and 26, 100 parts by weight of the aromatic polyester and 67 parts by weight of a glass fiber (EFH75-01 produced by Central Glass Co. Ltd.) were mixed and melt-kneaded at a temperature of 240° to 360° C. on a twin-screw extruder (PCM-30 mfd. by Ikegai Iron Works, Ltd.) to produce a pellet having a flow temperature shown in Table 5. In examples other than Examples 25 and 26, pellets were produced in the same manner as above except that nothing was blended with the aromatic polyester.

First, the thin-wall flow length was measured by the foregoing method in which the pellets were injection-molded. And then, various test pieces were prepared by molding, and the physical properties were measured by the foregoing methods. The results are collectively shown in Table 6.

Comparing Comparative Example 8 with Examples 14 to 26, particularly with Examples 16 to 18, shows the following:

First, the improvement in tensile strength and thin-wall flow length of thin-wall molded products by the combined use of 4,4'-dihydroxydiphenyl and resorcinol, a meta-orienting monomer, as aromatic diols demonstrates that the liquid crystalline property of the aromatic polyester is not relieved but rather strengthened. However, the mechanical properties such as Izod impact strength are improved. In addition, the combined use of resorcinol with another aromatic diol strengthens the liquid crystalline property of the aromatic polyester. At the same time it eliminates the disadvantages, such as low impact strength, shared by conventional polyesters showing liquid crystalline property in molten state.

The beneficial nature of resorcinol that improves both the liquid crystalline property and mechanical properties of the aromatic polyester was a surprise also to the present inventors.

Moreover, when notice is given to the flow temperature, molding temperature and heat distortion temperature, its is shown that the combined use of resorcinol with another monomer aromatic diol lowers the flow temperature necessary for obtaining good physical properties and enables the molding at relatively low temperatures.

That is, since the use of resorcinol with another aromatic diol lowers the melting point of the polyester showing liquid crystalline property in molten state without damaging the mechanical properties thereof, it enables the provision of the polyester which can be molded at relatively low temperatures. Furthermore, it can be seen that the reinforcement of the polyester showing liquid crystalline property in molten state by a glass fiber raises the heat resistance to solder to 260° C. or more.

EXAMPLES 27 AND 31 AND COMPARATIVE EXAMPLE 9

Aromatic Polyester (4) Having Resorcinol Structure

In a polymerization vessel equipped with an anchor-shaped stirring blade were charged p-hydroxybenzoic acid, terephthalic acid, resorcinol and hydroquinone so that the total amount of these monomers was 12 moles and the molar ratio between them was varies as shown in Table 7. To the resulting mixture was added acetic anhydride in an amount of 1.1 moles per mole of hydroxyl groups. After stirring for 15 minutes, pyridine was added thereto in an amount of 0.5 part by weight per 100 parts by weight of the total weight of resorcinol and hydroquinone.

Thereafter, the atmosphere in the reaction system was sufficiently replaced by nitrogen, and acetylation was carried out for 1 hour at a reaction temperature of 100° C. Thereafter, the contents of the vessel were heated to 310° C. at a rate of temperature-rise of 1° C./min while removing formed acetic acid by distillation, and polymerization was carried out for 15 minutes at normal pressure.

The reaction product was taken out of the system and pulverized into a powder of 300 μm or less in particle size using a Bantam mill (mfd. by Hosokawa Micron Inc.). The powder was further treated at 300° C. for 3 hours in a nitrogen gas atmosphere to obtain the powdery aromatic polyester of resorcinol structure having a flow temperature of 290° to 350° C.

The lightness (L value) and color tone, a value and b value, of the aromatic polyester were measured according to the foregoing method. The results are collectively shown in Table 7. From Table 7, it can be seen that the lightness and color tone are good in all the Examples.

In Examples 27 and 31, 100 parts by weight of the aromatic polyester and 67 parts by weight of a glass fiber (EFH75-01 produced by Central Glass Co. Ltd.) were mixed and melt-kneaded at a temperature of 300° to 360° C. on a twin-screw extruder (PCM-30 produced by Ikegai Iron Works, Ltd.) to produce a pellet having a flow temperature shown in Table 7. In Examples other than Examples 27 and 31, pellets were produced in the same manner as above except that nothing was blended with the aromatic polyester. Various test pieces were prepared from the resulting pellets by injection molding, and the physical properties were measured by the foregoing methods. The results are collectively shown in Table 8.

Comparing Comparative Example 9 with Examples 27 to 31, particularly with Examples 28 to 29, shows the following:

The use of hydroquinone alone as a monomer aromatic diol (Comparative Example 9) gave an aromatic polyester which does not melt even when heated at the flow temperature or higher. Thus, no injection-moldable aromatic polyester can be obtained by the use of hydroquinone alone. In contrast, the combined use of hydroquinone and resorcinol, a meta-orienting monomer, as aromatic diols (Examples 27 to 31) gave an injection-moldable aromatic polyester. That is, it enables the provision of a polyester showing liquid crystalline property which has good mechanical properties and well-balanced characteristics between heat resistance and moldability.

REFERENCE EXAMPLES 5 TO 7

Acetylation of Resorcinol—Amount of Catalyst Added

Using the same reaction apparatus as used in Referential Example 1, three kinds of an acetic anhydride solution of resorcinol were prepared in the same manner as in Referential Example 1. Thereafter, pyridine was added as a tertiary amine to the above solutions in amounts of 0.05, 0.1 and 0.5 part by weight, respectively, per 100 parts by weight of resorcinol (Referential Examples 5 to 7). The flasks were immersed in an oil bath, and reaction was carried out under the conditions shown in Table 9. The reaction products were analyzed by HPLC, and the results are collectively shown in Table 9.

It can be seen that the addition of pyridine in an amount of 0.1 part by weight or more gave colorless and transparent resorcinol diacetate.

EXAMPLES 32 TO 34

Aromatic Polyester (5) Having Resorcinol Structure

In a polymerization vessel equipped with an anchor-shaped stirring blade were charged p-hydroxybenzoic acid, terephthalic acid and resorcinol so that the total amount of these monomers was 12 moles and the molar ratio between them was varied as shown in Table 10. To the resulting mixture was added acetic anhydride in an amount of 1.1 moles per mole of hydroxy groups. After stirring for 15 minutes, pyridine was added in an amount of 0.05 part by weight per 100 parts by weight of resorcinol. Thereafter, the atmosphere in the reaction system was sufficiently replaced by nitrogen, and acetylation was carried out for 1 hour under reflux.

Thereafter, the contents of the vessel were heated to 270° C. at a rate of temperature-rise of 1° C./min while removing formed acetic acid by distillation. After maintaining the temperature at 270° C. for 90 minutes, the temperature was further raised to 300° C. at a rate of temperature-rise of 1° C./min.

Thereafter, polymerization at normal pressure was carried out for 50 minutes. The polymers thus obtained were pulverized into particles of 300 μm or less in particle size using a Bantam mill (mfd. by Hosokawa Micron Inc.). In Examples 32 and 33, solid-phase polymerization was further carried out at 210° C. for 3 hours in nitrogen atmosphere.

The results of analysis of the aromatic polyesters obtained are shown in Table 10, and the physical properties of molded products are shown in Table 11.

From the above results, it can be seen that the aromatic polyesters having resorcinol structure produced using highly pure resorcinol diacetate synthesized in the presence of a tertiary amine are superior in heat resistance and mechanical properties and satisfactory in melt-moldability and color tone.

EXAMPLES 35 TO 44

Aromatic Polyester (6) Having Resorcinol Structure

In a polymerization vessel equipped with an anchor-shaped stirring blade were charged p-hydroxybenzoic acid, terephthalic acid, resorcinol and 4,4'-dihydroxydiphenyl so that the total amount of these monomers was 12 moles and the molar ratio between them was varied as shown in Table 12. To the resulting mixture was added acetic anhydride in an amount of 1.1 moles per mole of hydroxyl groups. After stirring for 15 minutes, pyridine was added in an amount of 0.05 part by weight per 100 parts by weight of the total weight of resorcinol and 4,4'-dihydroxydiphenyl.

Thereafter, the atmosphere in the reaction system was sufficiently replaced by nitrogen, and acetylation was carried out for 1 hour under reflux. Thereafter, the contents of the vessel were heated to 270° C. at a rate of temperature-rise of 1° C./min while removing formed acetic acid by distillation. After maintaining the temperature at 270° C. for 1 hour, the temperature was further raised to 300° C. at a rate of temperature-rise of 1° C./min, and polymerization was carried out for 70 minutes at normal pressure. The reaction product in molten state was taken out of the system and solidified at room temperature. The yield in every case in Table 12 was in the range of 94 to 98% of the theoretical yield.

Every reaction product was pulverized into a powder of 300 μm or less in particle size using a Bantam mill (mfd. by Hosokawa Micron Inc.). The powder was further treated at 300° C. for 3 hours in a nitrogen gas atmosphere to obtain a powdery aromatic polyester of resorcinol structure which has a flow temperature of 230° to 340° C. The lightness (L value) and color tone, a value and b value, of the aromatic polyester were measured according to the foregoing method. The results are collectively shown in Table 12. From Table 12, it can be seen that the lightness and color tone are good in all the Examples.

In Examples 43 and 44, 100 parts by weight of the aromatic polyester and 67 parts by weight of a glass fiber (EFH75-01 produced by Central Glass Co. Ltd.) were mixed and melt-kneaded at a temperature of 240° to 360° C. on a twin-screw extruder (PCM-30 produced by Ikegai Iron Works, Ltd.) to produce a pellet having a flow temperature shown in Table 12. In Examples other than Examples 43 and 44, pellets were produced in the same manner as above except that nothing was blended with the aromatic polyester.

First, the thin-wall flow length was measured by the foregoing method in which the pellets were injection-molded. And then, various test pieces were prepared by molding, and the physical properties were measured by the foregoing methods. The results are collectively shown in Table 13.

Since the use of resorcinol with another aromatic diol lowers the melting point of the polyester showing liquid crystalline property in molten state without damaging the mechanical properties thereof, it enables the provision of the polyester which can be molded at relatively low temperatures. Moreover, it can be seen that the reinforcement of the polyester showing liquid crystalline property in molten state with a glass fiber raises the heat resistance to solder to 260° C. or more.

EXAMPLES 45 AND 46

Aromatic Polyester (7) Having Resorcinol Structure

In a polymerization vessel equipped with an anchor-shaped stirring blade were charged p-hydroxybenzoic acid, terephthalic acid, resorcinol and hydroquinone so that the total amount of these monomers was 12 moles and the molar ratio between them was varied as shown in Table 14. To the resulting mixture was added acetic anhydride in an amount of 1.1 moles per mole of hydroxyl groups. After stirring for 15 minutes, pyridine was added in an amount of 0.05 part by weight per 100 parts by weight of the total weight of resorcinol and hydroquinone.

Thereafter, the atmosphere in the reaction system was sufficiently replaced by nitrogen, and acetylation was carried out for 1 hour under reflux. Thereafter, the contents of the vessel were heated to 310° C. at a rate of temperature-rise of 1° C./min while removing formed acetic acid by distillation, and polymerization was carried out for 15 minutes at normal pressure.

The reaction product was taken out of the system and pulverized into a powder of 300 μm or less in particle size using a Bantam mill (mfd. by Hosokawa Micron Inc.). The powder was further treated at 300° C. for 3 hours in a nitrogen gas atmosphere to obtain a powdery aromatic polyester having resorcinol structure of which the flow temperature is shown in Table 14.

The lightness (L value) and color tone, a value and b value, of the aromatic polyester were measured according to the foregoing method. The results are collectively shown in Table 14. Table 14 shows that the lightness and color tone are good in all the Examples.

100 Parts by weight of the aromatic polyester and 67 parts by weight of a glass fiber (EFH75-01 produced by Central Glass Co. Ltd.) were mixed and melt-kneaded at a temperature of 300° to 360° C. on a twin-screw extruder (PCM-30 produced by Ikegai Iron Works, Ltd.) to produce a pellet having a flow temperature shown in Table 14. Various test pieces were prepared from the resulting pellets by injection molding, and the physical properties were measured by the foregoing methods. The results are collectively shown in Table 15.

The combined use of resorcinol and hydroquinone enables the provision of a polyester showing liquid crystalline property in molten state which has good mechanical properties and well-balanced characteristics between heat resistance and moldability.

EXAMPLE 47

Even when m-hydroxybenzoic acid, 6-hydroxy-2-naphthoic acid, 4-hydroxy-1-naphthoic acid, methylhydroquinone, chlorohydroquinone, 4,4'-dihydroxydiphenylmethane, 4,4'-dihydroxydiphenylethane, 4,4'-dihydroxydiphenyl ether, 4,4'-dihydroxybenzophenone, 4,4'-dihydroxydiphenyl sulfone, 4,4'-dihydroxydiphenyl sulfide, isophthalic acid, 2,6-naphthalenedicarboxylic acid, 1,4-naphthalenedicarboxylic acid and the like are used as a monomer copolymerized with resorcinol, an aromatic polyester having superior heat resistance and mechanical properties and good melt-moldability and color tone can be produced by using highly pure resorcinol diacetate synthesized in the presence of a tertiary amine.

TABLE 1

| | | Results of analysis by HPLC (mole %) | | | | |
|---|---|---|---|---|---|---|
| | Catalyst | Conversion | Selectivity | Yield | Percent formation of by-products | Coloration |
| Comparative Referential Example 1 | — | 100 | 90.0 | 90.0 | 9.8 | Orange and transparent |
| Comparative Referential Example 2 | Conc. sulfuric acid | 100 | 93.1 | 93.1 | 6.6 | Red and transparent |
| Referential Example 1 | Pyridine | 100 | 100 | 100 | 0 | Colorless and transparent |
| Referential Example 2 | Triethylamine | 82.6 | 100 | 82.6 | 0 | Colorless and transparent |
| Referential Example 3 | N,N-dimethylaniline | 78.4 | 100 | 78.4 | 0 | Colorless and transparent |
| Referential Example 4 | 4-Dimethylaminopyridine | 100 | 100 | 100 | 0 | Colorless and transparent |

TABLE 2

| | Molar ratio of monomers | | | Flow temperature (°C.) | GPC | | | Lightness and color tone | | | Liquid crystalline property in molten state |
|---|---|---|---|---|---|---|---|---|---|---|---|
| | p-Hydroxy benzoic acid | Terephthalic acid | Resorcinol | | Number average molecular weight ($M_n$) | Weight average molecular weight ($M_W$) | $M_W/M_n$ | L | a | b | |
| Example 1 | 0 | 100 | 100 | 262 | $1.43 \times 10^4$ | $3.39 \times 10^4$ | 2.37 | 83 | 1.1 | 19.8 | Not observed |
| Example 2 | 100 | 100 | 100 | 231 | $1.18 \times 10^4$ | $3.01 \times 10^4$ | 2.55 | 83 | 1.0 | 19.8 | Not observed |
| Example 3 | 200 | 100 | 100 | 244 | $1.55 \times 10^4$ | $4.77 \times 10^4$ | 3.08 | 84 | 0.9 | 19.8 | Not observed |
| Example 4 | 350 | 100 | 100 | 259 | $1.87 \times 10^4$ | $5.30 \times 10^4$ | 2.84 | 85 | 0.9 | 19.7 | Observed |
| Example 5 | 450 | 100 | 100 | 261 | $9.44 \times 10^3$ | $2.71 \times 10^4$ | 2.87 | 87 | 0.9 | 19.7 | Observed |
| Example 6 | 800 | 100 | 100 | 309 | Insoluble in solvents | | | 88 | 0.9 | 19.7 | Observed |
| Example 7 | 350 | 100 | 102.5 | 276 | $2.00 \times 10^4$ | $6.67 \times 10^4$ | 3.34 | 84 | 0.9 | 19.8 | Observed |
| Comparative Example 1 | 350 | 100 | 100 | 223 | $9.98 \times 10^3$ | $2.50 \times 10^4$ | 2.51 | 61 | 7.6 | 22.6 | Immeasurable owing to violent |

TABLE 2-continued

| | Molar ratio of monomers | | | Flow temperature (°C.) | GPC | | | Lightness and color tone | | | Liquid crystalline property in molten state |
|---|---|---|---|---|---|---|---|---|---|---|---|
| | p-Hydroxy-benzoic acid | Tere-phthalic acid | Resor-cinol | | Number average molecular weight ($M_n$) | Weight average molecular weight ($M_W$) | $M_W/M_n$ | L | a | b | |
| | | | | | | | | | | | coloration |

TABLE 3

| | Molding Temperature (°C.) | HDT (°C.) | Flexural strength (Kgf/cm$^2$) | Flexural modulus (kgf/cm$^2$) |
|---|---|---|---|---|
| Example 4 | 300 | 166 | 1060 | 32200 |
| Example 5 | 300 | 167 | 790 | 38000 |
| Example 6 | 370 | 207 | 700 | 72000 |
| Comparative Example 1 | 300 | 151 | 660 | 29900 |

TABLE 4

| | Molar ratio of monomers | | | | |
|---|---|---|---|---|---|
| | p-Hydroxy-benzoic acid | Tere-phthalic acid | Resor-cinol | Aromatic diol | (species) |
| Example 8 | 400 | 100 | 90 | 10 | (hydroquinone) |
| Example 9 | 400 | 100 | 50 | 50 | (phenylhydroquinone) |
| Example 10 | 400 | 100 | 60 | 40 | (4,4'-dihydroxydiphenyl) |
| Example 11 | 400 | 100 | 50 | 50 | [2,2-bis(4-hydroxyphenyl)propane] |
| Example 12 | 400 | 100 | 50 | 50 | (2,6-dihydroxynaphthalene) |
| Example 13 | 400 | 100 | 50 | 50 | (1,4-dihydroxynaphthalene) |
| Comparative Example 2 | 400 | 100 | 90 | 10 | (hydroquinone) |
| Comparative Example 3 | 400 | 100 | 50 | 50 | (phenylhydroquinone) |
| Comparative Example 4 | 400 | 100 | 60 | 40 | (4,4'-dihydroxydiphenyl) |
| Comparative Example 5 | 400 | 100 | 50 | 50 | [2,2-bis(4-hydroxyphenyl)propane] |
| Comparative Example 6 | 400 | 100 | 50 | 50 | (2,6-dihydroxynaphthalene) |
| Comparative Example 7 | 400 | 100 | 50 | 50 | (1,4-dihydroxynaphthalene) |

| | Flow temperature (°C.) | Liquid crystalline property in molten state | Lightness and color tone | | | Molding temperature (°C.) | HDT (°C.) |
|---|---|---|---|---|---|---|---|
| | | | L | a | b | | |
| Example 8 | 309 | Observed | 86 | 0.9 | 19.8 | 360 | 144 |
| Example 9 | 286 | Observed | 87 | 0.9 | 19.7 | 320 | 132 |
| Example 10 | 280 | Observed | 85 | 1.0 | 19.9 | 310 | 196 |
| Example 11 | 297 | Not observed | 86 | 0.9 | 19.8 | 330 | 121 |
| Example 12 | 273 | Observed | 84 | 1.1 | 20.0 | 310 | 109 |
| Example 13 | 284 | Observed | 84 | 1.2 | 19.8 | 310 | 111 |
| Comparative Example 2 | 254 | Immeasurable owing to violent coloration | 61 | 6.6 | 21.5 | 360 | 122 |
| Comparative Example 3 | 266 | Immeasurable owing to violent coloration | 60 | 8.0 | 22.7 | 320 | 112 |
| Comparative Example 4 | 260 | Immeasurable owing to violent coloration | 59 | 8.0 | 23.1 | 310 | 172 |
| Comparative Example 5 | 272 | Immeasurable owing to violent coloration | 59 | 7.2 | 23.0 | 330 | 112 |
| Comparative Example 6 | 250 | Immeasurable owing to violent coloration | 57 | 8.1 | 23.2 | 310 | 102 |
| Comparative Example 7 | 262 | Immeasurable owing to violent coloration | 58 | 8.0 | 23.7 | 310 | 100 |

TABLE 5

| | Molar ratio of monomers | | | | Glass fiber (part by weight) | Lightness and color tone | | | Flow temperature (°C.) | Molding temperature (°C.) |
|---|---|---|---|---|---|---|---|---|---|---|
| | p-Hydroxy benzoic acid | Tere-phthalic acid | Resor-cinol | 4,4'-dihydroxy-diphenyl | | L | a | b | | |
| Example 14 | 150 | 100 | 50 | 50 | — | 80 | 1.9 | 19.9 | 275 | 305 |
| Example 15 | 250 | 100 | 50 | 50 | — | 83 | 1.8 | 19.8 | 280 | 305 |
| Example 16 | 300 | 100 | 25 | 75 | — | 86 | 0.7 | 19.1 | 306 | 335 |
| Example 17 | 300 | 100 | 50 | 50 | — | 84 | 1.6 | 19.8 | 276 | 305 |
| Example 18 | 300 | 100 | 75 | 25 | — | 83 | 1.9 | 19.8 | 217 | 245 |

TABLE 5-continued

| | Molar ratio of monomers | | | | Glass fiber (part by weight) | Lightness and color tone | | | Flow temperature (°C.) | Molding temperature (°C.) |
|---|---|---|---|---|---|---|---|---|---|---|
| | p-Hydroxy benzoic acid | Tere-phthalic acid | Resor-cinol | 4,4'-dihydroxy-diphenyl | | L | a | b | | |
| Example 19 | 350 | 100 | 50 | 50 | — | 85 | 1.0 | 19.8 | 287 | 320 |
| Example 20 | 375 | 100 | 50 | 50 | — | 86 | 1.0 | 19.7 | 285 | 310 |
| Example 21 | 400 | 100 | 50 | 50 | — | 85 | 0.9 | 19.8 | 293 | 315 |
| Example 22 | 450 | 100 | 50 | 50 | — | 86 | 0.8 | 19.7 | 296 | 325 |
| Example 23 | 500 | 100 | 50 | 50 | — | 87 | 0.9 | 19.7 | 300 | 325 |
| Example 24 | 700 | 100 | 50 | 50 | — | 87 | 0.8 | 19.6 | 300 | 325 |
| Example 25 | 350 | 100 | 50 | 50 | 67 | 85 | 0.9 | 19.9 | 297 | 330 |
| Example 26 | 400 | 100 | 50 | 50 | 67 | 86 | 0.9 | 19.9 | 303 | 330 |
| Comparative Example 8 | 300 | 100 | 0 | 100 | — | Not measured | | | 326 | 340 |

TABLE 6

| | Mechanical properties | | | | Thermal properties | | Moldability Thin-wall flow length (measurement temperature) (mm) |
|---|---|---|---|---|---|---|---|
| | Flexural strength (kg/cm$^2$) | Flexural modulus (kg/cm$^2$) | Izod impact strength (kg·cm/cm) | Tensile strength of thin-wall molded product (kg/cm$^2$) | Heat distortion temperature (18.6 kg/cm$^2$) (°C.) | Heat resistance to solder (°C.) | |
| Example 14 | 1,460 | 111,000 | 29 | 2,310 | 109 | Not measured | 25.0(320° C.) |
| Example 15 | 1,560 | 115,100 | 26 | 2,450 | 128 | Not measured | 24.7(320° C.) |
| Example 16 | 1,500 | 133,000 | 80 | 3,370 | 254 | Not measured | Not measured |
| Example 17 | 1,120 | 63,500 | 28 | 3,080 | 155 | Not measured | 25.5(320° C.) |
| Example 18 | 1,110 | 63,300 | 26 | 2,010 | 110 | Not measured | Not measured |
| Example 19 | 1,470 | 93,600 | 37 | 3,470 | 187 | Not measured | 24.8(330° C.) |
| Example 20 | 1,590 | 132,100 | 35 | 2,160 | 213 | Not measured | 23.2(330° C.) |
| Example 21 | 1,670 | 122,400 | 30 | 2,460 | 231 | Not measured | 20.8(330° C.) |
| Example 22 | 1,260 | 122,700 | 20 | 1,630 | 247 | Not measured | 21.2(340° C.) |
| Example 23 | 1,250 | 110,990 | 20 | 2,100 | 250 | Not measured | 19.9(340° C.) |
| Example 24 | 1,230 | 100,750 | 22 | 1,960 | 249 | Not measured | 19.8(340° C.) |
| Example 25 | 1,560 | 132,800 | 27 | 2,150 | 204 | 260 | 22.3(340° C.) |
| Example 26 | 1,760 | 165,100 | 30 | 1,910 | 228 | 270 | 19.3(340° C.) |
| Comparative Example 8 | 600 | 49,700 | 5 | 930 | 281 | Not measured | 9.7(320° C.) |

TABLE 7

| | Molar ratio of monomers | | | | Glass fiber (part by weight) | Lightness and color tone | | | Flow temperature (°C.) | Molding temperature (°C.) |
|---|---|---|---|---|---|---|---|---|---|---|
| | p-Hydroxy benzoic acid | Tere-phthalic acid | Resor-cinol | Hydro-quinone | | L | a | b | | |
| Example 27 | 300 | 100 | 75 | 25 | 67 | 87 | 0.8 | 19.8 | 298 | 340 |
| Example 28 | 350 | 100 | 70 | 30 | — | 87 | 0.7 | 19.7 | 305 | 340 |
| Example 29 | 350 | 100 | 90 | 10 | — | 85 | 0.9 | 19.9 | 280 | 320 |
| Example 30 | 400 | 100 | 70 | 30 | — | 87 | 0.7 | 19.6 | 343 | 380 |
| Example 31 | 400 | 100 | 70 | 30 | 67 | 87 | 0.8 | 19.6 | 330 | 370 |
| Comparative Example 9 | 350 | 100 | 0 | 100 | — | Not measured | | | 300 | Not moldable |

TABLE 8

| | Mechanical properties | | | | Thermal property |
|---|---|---|---|---|---|
| | Flexural strength (kg/cm$^2$) | Flexural modulus (kg/cm$^2$) | Izod impact strength (kg · cm/cm) | Tensile strength of thin-wall molded product (kg/cm$^2$) | Heat distortion temperature (18.6 kg/cm$^2$) (°C.) |
| Example 27 | 1,300 | 100,000 | 16 | 1,320 | 133 |
| Example 28 | 1,000 | 58,000 | 17 | 1,310 | 137 |
| Example 29 | 1,200 | 48,100 | 33 | 1,850 | 120 |
| Example 30 | 1,000 | 88,000 | 26 | 2,650 | 186 |
| Example 31 | 1,500 | 145,000 | 15 | 1,400 | 203 |
| Comparative Example 9 | Molded products cannot be obtained. | | | | Not moldable |

TABLE 9

| | Resorcinol (part by weight) | Pyridine (part by weight) | Reaction conditions | | Results of analysis by HPLC (mole %) | | | Coloration |
|---|---|---|---|---|---|---|---|---|
| | | | Temperature (°C.) | Time (min) | Conversion | Selectivity | Yield | |
| Referential Example 5 | 100 | 0.05 | Refluxing temperature | 60 | 100 | 100 | 100 | Pale yellow and transparent |
| Referential Example 6 | 100 | 0.1 | " | 60 | 100 | 100 | 100 | Colorless and transparent |
| Referential Example 7 | 100 | 0.5 | " | 60 | 100 | 100 | 100 | Colorless and transparent |

TABLE 10

| | Molar ratio of monomers | | | Flow temperature (°C.) | GPC | | | Lightness and color tone | | | Liquid crystalline property in molten state |
|---|---|---|---|---|---|---|---|---|---|---|---|
| | p-Hydroxy-benzoic acid | Tere-phthalic acid | Resor-cinol | | Number average molecular weight ($M_n$) | Weight average molecular weight ($M_w$) | $M_w/M_n$ | L | a | b | |
| Example 32 | 350 | 100 | 100 | 261 | 1.90 × 10$^4$ | 5.51 × 10$^4$ | 2.90 | 83 | 1.0 | 19.7 | Observed |
| Example 33 | 450 | 100 | 100 | 260 | 9.03 × 10$^3$ | 2.66 × 10$^4$ | 2.95 | 86 | 0.9 | 19.7 | Observed |
| Example 34 | 800 | 100 | 100 | 310 | Insoluble in solvents | | | 86 | 0.9 | 19.7 | Observed |

TABLE 11

| | Molding temperature (°C.) | HDT (°C.) | Flexural strength (kgf/cm$^2$) | Flexural modulus (kgf/cm$^2$) |
|---|---|---|---|---|
| Example 32 | 300 | 165 | 1040 | 32200 |
| Example 33 | 300 | 168 | 780 | 38100 |
| Example 34 | 370 | 207 | 720 | 73000 |

TABLE 12

| | Molar ratio of monomers | | | | Glass fiber (part by weight) | Lightness and color tone | | | Flow temperature (°C.) | Molding temperature (°C.) |
|---|---|---|---|---|---|---|---|---|---|---|
| | p-Hydroxy-benzoic acid | Tere-phthalic acid | Resor-cinol | 4,4'-dihydroxy-diphenyl | | L | a | b | | |
| Example 35 | 250 | 100 | 50 | 50 | — | 83 | 1.9 | 19.8 | 279 | 305 |
| Example 36 | 300 | 100 | 25 | 75 | — | 85 | 0.7 | 19.1 | 305 | 335 |
| Example 37 | 300 | 100 | 50 | 50 | — | 84 | 1.6 | 19.7 | 277 | 305 |
| Example 38 | 300 | 100 | 75 | 25 | — | 82 | 1.9 | 19.8 | 217 | 245 |
| Example 39 | 350 | 100 | 50 | 50 | — | 84 | 1.0 | 19.8 | 288 | 320 |
| Example 40 | 375 | 100 | 50 | 50 | — | 86 | 1.1 | 19.7 | 284 | 310 |
| Example 41 | 400 | 100 | 50 | 50 | — | 84 | 0.9 | 19.8 | 295 | 315 |
| Example 42 | 450 | 100 | 50 | 50 | — | 86 | 0.8 | 19.7 | 296 | 325 |
| Example 43 | 350 | 100 | 50 | 50 | 67 | 84 | 0.9 | 19.9 | 296 | 330 |
| Example 44 | 400 | 100 | 50 | 50 | 67 | 85 | 0.9 | 19.9 | 305 | 330 |

TABLE 13

| | Mechanical properties | | | | Thermal properties | | Moldability Thin-wall flow length (measurement temperature) (mm) |
|---|---|---|---|---|---|---|---|
| | Flexural strength (kg/cm$^2$) | Flexural modulus (kg/cm$^2$) | Izod impact strength (kg · cm/cm) | Tensile strength of thin-wall molded product (kg/cm$^2$) | Heat distortion temperature (18.6 kg/cm$^2$) (°C.) | Heat resistance to solder (°C.) | |
| Example 35 | 1,550 | 115,000 | 25 | 2,450 | 128 | Not measured | 24.9 (320° C.) |
| Example 36 | 1,480 | 132,900 | 75 | 3,370 | 254 | Not measured | Not measured |
| Example 37 | 1,130 | 63,500 | 28 | 3,080 | 155 | Not measured | 25.5 (320° C.) |

TABLE 13-continued

| | Mechanical properties | | | | Thermal properties | | Moldability Thin-wall |
|---|---|---|---|---|---|---|---|
| | Flexural strength ($kg/cm^2$) | Flexural modulus ($kg/cm^2$) | Izod impact strength (kg · cm/cm) | Tensile strength of thin-wall molded product ($kg/cm^2$) | Heat distortion temperature (18.6 $kg/cm^2$) (°C.) | Heat resistance to solder (°C.) | flow length (measurement temperature) (mm) |
| Example 38 | 1,120 | 63,200 | 26 | 2,010 | 110 | Not measured | Not measured |
| Example 39 | 1,480 | 93,800 | 40 | 3,490 | 188 | Not measured | 24.5 (330° C.) |
| Example 40 | 1,590 | 132,100 | 35 | 2,160 | 213 | Not measured | 23.2 (330° C.) |
| Example 41 | 1,670 | 122,600 | 35 | 2,460 | 232 | Not measured | 20.6 (330° C.) |
| Example 42 | 1,250 | 122,700 | 20 | 1,630 | 247 | Not measured | 21.2 (340° C.) |
| Example 43 | 1,540 | 133,000 | 27 | 2,170 | 205 | 260 | 22.0 (340° C.) |
| Example 44 | 1,770 | 165,300 | 35 | 1,930 | 228 | 270 | 19.3 (340° C.) |

TABLE 14

| | Molar ratio of monomers | | | | Glass fiber (part by weight) | Lightness and color tone | | | Flow temperature (°C.) | Molding temperature (°C.) |
|---|---|---|---|---|---|---|---|---|---|---|
| | P-Hydroxy-benzoic acid | Tere-phthalic acid | Resor-cinol | Hydro-quinone | | L | a | b | | |
| Example 45 | 300 | 100 | 75 | 25 | 67 | 85 | 0.9 | 19.8 | 300 | 340 |
| Example 46 | 400 | 100 | 70 | 30 | 67 | 85 | 0.9 | 19.6 | 330 | 370 |

TABLE 15

| | Mechanical properties | | | | Thermal property |
|---|---|---|---|---|---|
| | Flexural strength ($kg/cm^2$) | Flexural modulus ($kg/cm^2$) | Izod impact strength (kg · cm/cm) | Tensile strength of thin-wall molded product ($kg/cm^2$) | Heat distortion temperature (18.6 $kg/cm^2$) (°C.) |
| Example 45 | 1,400 | 100,200 | 19 | 1,350 | 135 |
| Example 46 | 1,400 | 145,000 | 15 | 1,410 | 203 |

INDUSTRIAL APPLICABILITY

The use of highly pure, meta-orienting resorcinol diacetates obtained by acetylating a resorcinol having the formula (14) in the presence of a tertiary amine enables the synthesis of an aromatic polyestr having a good balance between heat resistance, mechanical properties and melt-moldability and having a very good color tone, of which the industrial value is very high.

We claim:

1. A heat-resistant aromatic polyester resin which has resorcinol structure, has the formula (1),

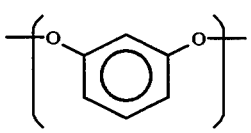
(1)

and gives a powder fraction having a lightness (L value) of 80 or more and a red degree (a value) of 3 or less, which powder fraction is obtained by pulverizing the heat-resistant aromatic polyester, sieving the pulverized polyester by Tyler standard sieves and being allowed to pass through 60-mesh sieve but not 325-mesh sieve, which heat-resistant aromatic polyester resin is produced by a method which comprises polymerizing a monomer of a resorcinol diacetate produced by reacting a resorcinol having the formula (14),

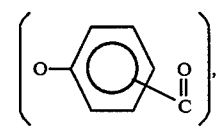
(14)

with acetic anhydride in the presence of a tertiary amine in an amount of 0.02 to 3 parts by weight per 100 parts by weight of resorcinol.

2. A heat-resistant aromatic polyester according to claim 1 characterized by containing at least one repeating unit selected from the group consisting of the units contained in the formula groups (2), (3) and (4), formula group (2),

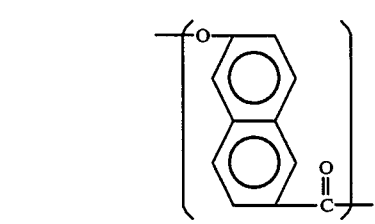

formula group (3),

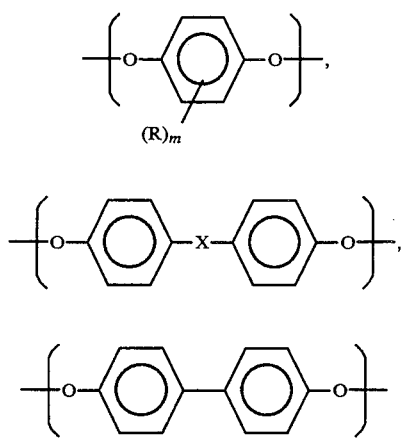

and formula group (4),

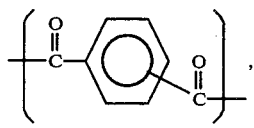

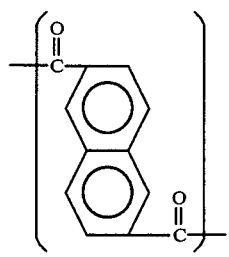

wherein R is halogen, $C_1-C_5$ alkyl, or phenyl; X is either one of

—O—, —CH$_2$—, —CH$_2$—CH$_2$—,

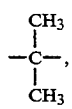

—SO$_2$— or —S—; and m is an integer of 0 to 2, and when the number of R in the repeating units is 2 or more, the two or more substituents represented by R may be different from each other.

3. A heat-resistant aromatic polyester according to claim 1 characterized by comprising 40 to 80 mole % of the repeating unit of the formula (6), 29 mole % or less of the repeating unit of formula (7), 1 to 30 mole % of the repeating unit of formula (8) and 10 to mole % of the repeating unit of the formula (9),

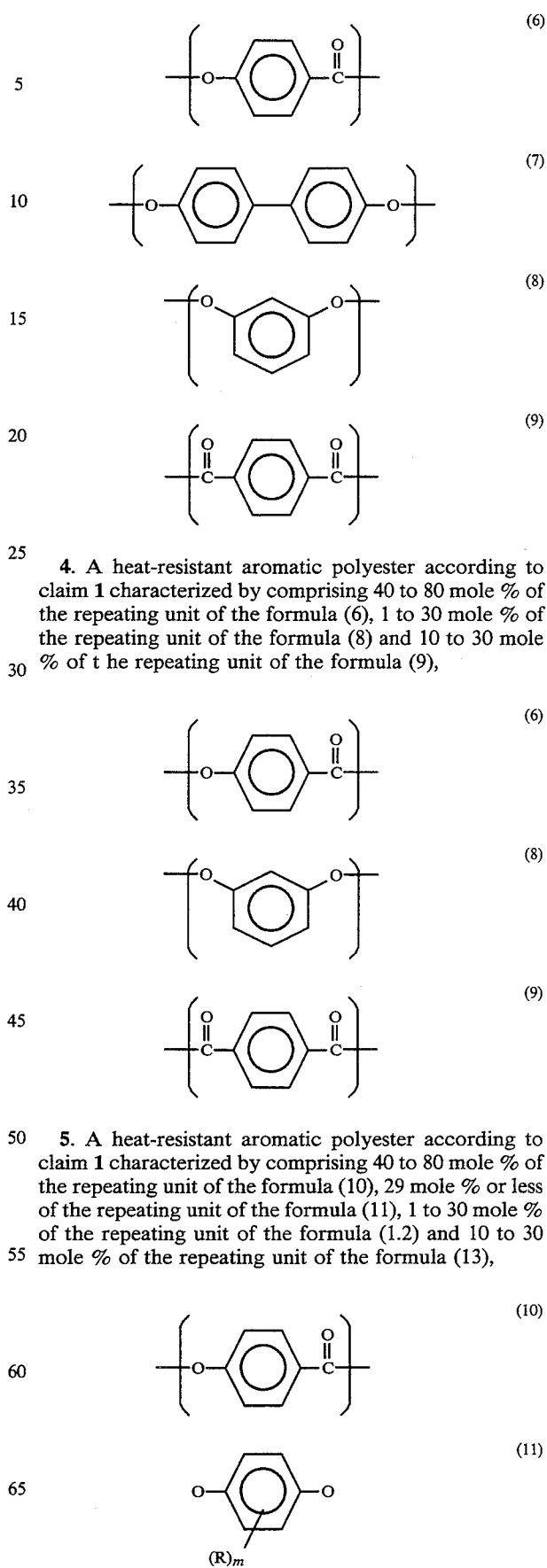

4. A heat-resistant aromatic polyester according to claim 1 characterized by comprising 40 to 80 mole % of the repeating unit of the formula (6), 1 to 30 mole % of the repeating unit of the formula (8) and 10 to 30 mole % of t he repeating unit of the formula (9), 5. A heat-resistant aromatic polyester according to claim 1 characterized by comprising 40 to 80 mole % of the repeating unit of the formula (10), 29 mole % or less of the repeating unit of the formula (11), 1 to 30 mole % of the repeating unit of the formula (1.2) and 10 to 30 mole % of the repeating unit of the formula (13),

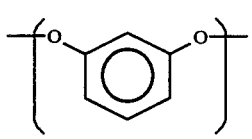
(12)

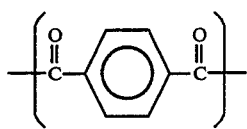
(13)

wherein R is halogen, $C_1$–$C_5$ alkyl or phenyl; m is an integer of 0 to 2, and when m is 2, the two substituents represented by R may be different from each other.

6. A heat-resistant aromatic polyester according to claim 1 characterized by comprising 40 to 80 mole % of the repeating unit of the formula (10), 1 to 30 mole % of the repeating unit of the formula (12) and 10 to 30 mole % of the repeating unit of the formula (13),

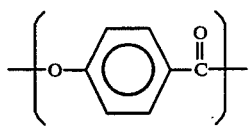
(10)

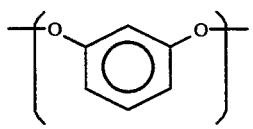
(12)

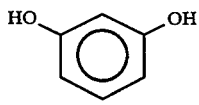
(13)

7. A method for producing a heat-resistant aromatic polyester which has a resorcinol structure of formula (1)

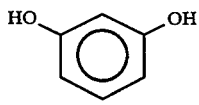
(1)

and gives a powder fraction having a lightness (L value) of 80 or more and a red degree (a value) of 3 or less, which powder fraction is obtained by pulverizing the heat-resistant aromatic polyester, sieving the pulverized polyester by Tyler standard sieves and being allowed to pass through 60-mesh sieve but not 325-mesh sieve, which comprises polymerizing a monomer of a resorcinol diacetate produced by reacting a resorcinol having the formula (14) with acetic anhydride in the presence of a tertiary amine, (14)

wherein the tertiary amine is present in an amount of 0.02 to 3 pans by weight per 100 parts by weight of resorcinol.

8. A heat-resistant aromatic polyester resin according to claim 1, wherein the powder fraction has a red degree of 2 or less.

* * * * *